United States Patent Office 3,403,114
Patented Sept. 24, 1968

3,403,114
POLYMERS OF AMINO EPOXIDES
Edwin J. Vandenberg, Foulk Woods, Del., assignor to Hercules Incorporated, Wilmington, Del., a corporation of Delaware
No Drawing. Continuation-in-part of application Ser. No. 369,322, May 21, 1964. This application Feb. 17, 1967, Ser. No. 616,781
12 Claims. (Cl. 260—2)

ABSTRACT OF THE DISCLOSURE

Polymers of amino epoxides, including homopolymers, and copolymers with other epoxides, such as alkylene oxides, and the quaternary salts of these amino epoxide polymers, which polymers are useful as flocculating agents.

This application is a continuation-in-part of my application U.S. Ser. No. 369,322, filed May 21, 1964, which is a continuation-in-part of my application U.S. Ser. No. 812,079, filed May 11, 1959, now U.S. 3,135,705, which is in turn a continuation-in-part of my application U.S. Ser. No. 738,626, filed May 29, 1958, and now abandoned.

This invention relates to polymers of amino epoxides.

In accordance with this invention, it has been determined that polymers having certain highly satisfactory properties can be derived by homopolymerizing an amino epoxide, copolymerizing an amino epoxide with at least one other amino epoxide, or copolymerizing at least one amino epoxide with other epoxides that do not contain an amino group. Block copolymers of an amino epoxide and another epoxide can also be prepared in accordance with this invention.

The polymers of this invention can be derived from amino epoxides having the formula (I) $(R'R''N)_n-(A)-(OCH_2)_{n'}-CH\underset{O}{\underset{\diagdown\diagup}{-}}CH-R$ wherein R' and R'' are the same or different radicals and are selected from the group consisting of
  alkyl which can be straight chain or branched chain alkyl having from 1 through 20 carbon atoms such, for example, as methyl, ethyl, n-propyl, isopropyl, n-butyl, tert-butyl, isobutyl, n-pentyl, n-hexyl, n-heptyl, n-octyl, 2,4-dimethyloctyl, dodecyl, and octadecyl,
  cycloalkyl such as cyclopentyl, cyclohexyl, and cycloheptyl,
  aryl such as phenyl, diphenyl, and naphthyl, haloaryl such as chlorophenyl, bromophenyl, dichlorophenyl, and the like,
  alkaryl such as methylphenyl, dimethylphenyl, ethylphenyl, and the like,
  aralkyl such as benzyl, and the like,
  aryloxyalkyl such as phenoxymethyl, phenoxyethyl, phenoxypropyl, and the like,
  alkoxyalkyl such as methoxymethyl, methoxyethyl, ethoxymethyl, ethoxyethyl, and the like;
A is a bivalent radical selected from the group consisting of
  alkylene such as methylene, ethylene, trimethylene, tetramethylene, and the like,
  cycloalkylene such as cyclopentylene, cyclohexylene, and cycloheptylene,
  arylene such as phenylene, and the like,

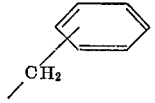

and

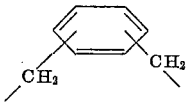

$n$ is an integer of from 1 through 3,
$n'$ is an integer of from 0 through 1,
R is selected from the group consisting of
  $(R'R''N)_n-(A)-(OCH_2)_{n'}-$ wherein R', R'', A, $n$ and $n'$ are as above defined,
  hydrogen,
  alkyl such, for example, as those above enumerated,
  aryl such, for example, as those above enumerated,
  haloaryl such, for example, as those above enumerated,
  alkaryl such, for example, as those above enumerated,
  aralkyl such, for example, as those above enumerated,
  aryloxyalkyl such, for example, as those above enumerated, and
  alkoxyalkyl such, for example, as those above enumerated.

In the above formula, when A is arylene, such as phenylene, R' and R'' can, in addition to being one of the radicals above enumerated, be hydrogen. Also when A is alkylene then $n$ is one, and when A is cycloalkylene, arylene,

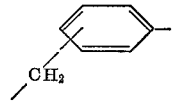

or

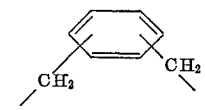

then $n$ can be 1, 2, or 3.

Specific examples of amino epoxides that can be homopolymerized or copolymerized in accordance with this invention include 1-dimethylamino-2,3-epoxypropane
1-diethylamino-2,3-epoxypropane
1-dicyclohexylamino-2,3-epoxypropane
cis-1,4-bis(dimethylamino)-2,3-epoxybutane
trans-1,4-bis(dimethylamino)-2,3-epoxybutane
cis-1,4-bis(diethylamino)-2,3-epoxybutane
trans-1,4-bis(diethylamino)-2,3-epoxybutane
cis-1-dimethylamino-2,3-epoxybutane
o-, m-, or p-dimethylaminophenyl glycidyl ether
o-, m-, or p-diethylaminophenyl glycidyl ether
diethylaminomethylphenyl ethylene oxide
dimethylaminonaphthyl glycidyl ether
1-chlorophenylmethylamino-2,3-epoxypropane
1-chlorophenylethylaminophenyl glycidyl ether
1-monomethylaminophenyl-2,3-epoxypropane
methylaminophenyl glycidyl ether
ethylaminophenyl glycidyl ether
phenylaminophenyl glycidyl ether
naphthylaminophenyl glycidyl ether
o-methyl-p-dimethylaminophenyl glycidyl ether
p-diethylaminophenylmethyl glycidyl ether
bis(methoxyethyl)aminophenyl glycidyl ether
o,p-bis(dimethylamino)phenyl glycidyl ether The amino epoxides can be homopolymerized, copolymerized to form normal random copolymers with other amino epoxides, or copolymerized with other epoxides containing no amino group. Block copolymers can be prepared by first polymerizing one monomer or monomer mixture followed by the addition to the polymerization reaction mass of a second different monomer or monomer mixture. In preparing block copolymers, the monomers can be added to the polymerization reaction vessel in any order, although it is preferred to add the amino epoxide monomer last.

Also, and in accordance with this invention, it has been determined that an amino epoxide, as above defined, can be converted by known methods to the quaternized form thereof and subsequently homopolymerized or copolymerized with a different monometer which can be an amino epoxide, a quaternized amino epoxide, or an epoxide containing no amino group.

The quaternized amino epoxides have the formula (II) 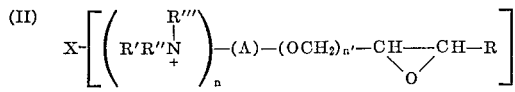

wherein R, R', R", A, n, and n' are as above defined, R''' is an alkyl, cycloalkyl, or aralkyl such, for example, as the alkyl, cycloalkyl and aralkyl radicals above enumerated, R''' can be the same as R' or R" or it can be a different radical, and $X^-$ represents an anion selected from the group consisting of anions of salt forming acids such as $Cl^-$, $Br^-$, $I^-$, $F^-$, $SO_4^=$, and $R_1COO^-$ such as stearate, formate, acetate, benzoate, fatty acid anions, and resin acid anions. $R_1$ represents a hydrocarbon radical such as alkyl, cycloalkyl, aryl, alkaryl, aralkyl, and haloalkyl.

The cyclic amino epoxides can also be homopolymerized or copolymerized in accordance with this invention. These compounds have the formula (III) 

wherein $m$ is an integer of from 3 through 10, $R_2$ is selected from the group consisting of hydrogen and alkyl such as methyl, ethyl, propyl, and isopropyl, and Y is selected from the group consisting of hydrogen and R'R"N— wherein R' and R" are as above defined, and wherein at least one Y is R'R"N—. Specific examples of these compounds include 3-dimethylamino-1,2-epoxycyclohexane,
4-dimethylamino-1,2-epoxycyclohexane,
4-diethylamino-1,2-epoxycyclohexane,
4-methylethylamino-1,2-epoxycyclohexane,
3,4-bis(diethylamino)-1,2-epoxycyclohexane,
3,5-bis(diethylamino)-1,2-epoxycyclohexane,
5-dimethylaminophenyl-1,2-epoxycyclohexane,
4-diethylamino-1,2-epoxycycloheptane,
3-diethylamino-1,2-epoxycyclooctane,
4-diethylamino-1,2-epoxycyclododecane,
3-dimethylamino-1,2-epoxycyclopentane,
4-diethylamino-1,2-epoxycyclopentane,
4-dimethylamino-5-methyl-1,2-epoxycyclohexane, and
4-methylethylamino-5-isopropyl-1,2-epoxycyclohexane.

The quaternized form of these compounds can be employed also.

Other epoxides containing no amino group that can be copolymerized with at least one amino epoxide or quaternized amino epoxide include the alkylene oxides such as ethylene oxide, propylene oxide, butene-1-oxide, cis-butene-2-oxide, trans-butene-2-oxide, and isobutylene epoxide; the substituted alkylene oxides such as epichlorohydrin, epibromohydrin, methallyl chloride epoxide, trifluoromethyl ethylene oxide, perfluoropropylene oxide, perfluoroethylene oxide, vinyl chloride epoxide, dichloroisobutylene epoxide, 1,2 - dichloro - 3,4 - epoxybutane, 1-chloro-3,4-epoxybutane, 1 - chloro - 4,5 - epoxypentane, 1,1-dichloro-2,3-epoxypropane, 1,1,1-trichloro-2,3-epoxypropane, and 1,1,1 - trichloro - 3,4 - epoxybutane; cycloaliphatic epoxides such as the cyclohexene oxides, the vinyl cyclohexene oxides (mono- and dioxides), α-pinene epoxide, and dipentene epoxide; epoxy ethers such as the alkyl glycidyl ether as, for example, methyl glycidyl ether, ethyl glycidyl ether, isopropyl glycidyl ether, isobutyl glycidyl ether, tert-butyl glycidyl ether, n-hexyl glycidyl ether, n-octyl glycidyl ether, and the like; phenyl glycidyl ether, the chlorophenyl glycidyl ethers, the nitrophenyl glycidyl ethers, the alkylphenyl glycidyl ethers, the chloroalkyl glycidyl ethers, such as chloroethyl glycidyl ether, bromoethyl glycidyl ether, and 2-chloro-1-methyl ethyl glycidyl ether, unsaturated glycidyl ethers such as vinyl glycidyl ether, allyl glycidyl ether, and o-allylphenyl gycidyl ether; glycidyl esters such as glycidyl acetate, glycidyl propionate, glycidyl pivalate, glycidyl methacrylate, glycidyl acrylate, and the like; alkyl glycidates such as methyl glycidate and ethyl glycidate; and other epoxides as, for example, styrene oxide, α-methylstyrene oxide, butadiene mono- and dioxides, epoxy stearates, and trimethyl 2,3-epoxypropyl ammonium chloride.

Any organoaluminum compound reacted with water can be used as the catalyst for the polymerization of amino epoxides in accordance with this invention. These catalysts are disclosed and described in application Ser. No. 812,079, filed May 11, 1959, now U.S. 3,135,705, reference to which is hereby made.

Thus, the polymers of this invention can be prepared by contacting an amino epoxide with a catalyst formed by reacting an organoaluminum compound containing at least one aluminum-to-carbon bond, such as triethylaluminum, with water in an amount such that the molar ratio of water to organoaluminum compound is within the range of from about 0.1 to about 1.5 and is lower than the number of aluminum-to-carbon bonds in the organoaluminum compound.

Any desired procedure can be used for reacting the organoaluminum compound with the specified molar ratio of water. Preferred methods are disclosed and described in U.S. 3,135,705.

Also, the organoaluminum compound can be first reacted with from about 0.01 mole to about 1.5 moles of a chelating agent, such as acetylacetone, prior to reaction with water to provide a satisfactory catalyst. Suitable chelating agents are disclosed in U.S. 3,135,705.

Any amount of the organoaluminum-water reaction product can be used to catalyze the polymerization process in accordance with this invention from a minor catalytic amount up to a large excess but, in general, will be within the range of from about 0.2 to 10 mole percent based on the monomer being polymerized and preferably will be within the range of from about 1 to about 5 mole percent based on the monomer being polymerized.

The polymerization reaction can be carried out by any desired means, either as a batch or continuous process with the catalyst added all at one time or in increments during the polymerization or continuously throughout the polymerization. If desired, the monomer may be added gradually to the polymerization system.

The polymerization reaction can be carried out as a bulk polymerization process, in some cases at the boiling point of the monomer (reduced to a convenient level by adjusting the pressure) so as to remove the heat of reaction. However, for ease of operation, it is more generally carried out in the presence of an inert diluent. Any diluent that is inert under the polymerization reaction conditions can be used as, for example, ethers such as the dialkyl, aryl, or cycloalkyl ethers as, for example, diethyl ether, dipropyl ether, diisopropyl ether, aromatic hydrocarbons such as benzene, toluene, and the like, or saturated aliphatic hydrocarbons and cycloaliphatic hydrocarbons such as n-heptane and cyclohexane, and halogenated hydrocarbons as, for example, chlorobenzene or haloalkenes such as methyl chloride, methylene chloride, chloroform, carbon tetrachloride and ethylene dichloride. Mixtures of two or more diluents can be used and in many cases are preferable. For example, when saturated aliphatic hydrocarbons are used as a diluent, it is preferable, particularly if high molecular weight polymers are desired or if very little diluent is present, to use them in admixture with ethers. A complexing agent for the organoaluminum compound, such as ether, tetrahydrofuran, and the like, can be used and is particularly desirable in a bulk polymerization process.

The polymerization process in accordance with this invention can be carried out over a wide temperature range and pressure. Usually, it will be carried out at a temperature from about −80° C. up to about 250° C., preferably from about −80° C. to about 150° C. and more preferably within the range of about −30° C. to about 100° C. Usually, the polymerization process will be carried out at autogeneous pressure, but superatmospheric pressures up to several hundred pounds can be used if desired, and, in the same way, subatmospheric pressures can also be used.

While the catalysts described above are preferred for use in carrying out this invention, there can be employed as a catalyst for the polymerization of the amino epoxides a halogen-free organomagnesium compound that has been reacted with at least one polyreactive compound. The amount of the total polyreactive compound that is reacted with the organomagnesium compound is important and should be an equivalent mole ratio within the range of from about 0.01 to about 0.7, and preferably from about 0.05 to about 0.5, of the polyreactive compound to the organomagnesium compound.

Any organomagnesium compound, which contains no halogen, when reacted with a polyreactive compound can be used as a catalyst for the polymerization of amino epoxides. Preferably, the organomagnesium compound will have the formula RR′Mg where R is any hydrocarbon radical, as for example, alkyl, alkenyl, cycloalkyl, cycloalkenyl, aryl, alkaryl, cycloalkylaryl, and the like, and R′ is the same as R or is H, —OR, —NR$_2$, SR, and the like. Exemplary of the organomagnesium compounds that can be used for the preparation of the catalyst are dimethylmagnesium, diethylmagnesium, dipropylmagnesium, diisopropylmagnesium, di-n-butylmagnesium, diisobutylmagnesium, di-(tert-butyl)-magnesium, diamylmagnesium, dioctylmagnesium, dicyclohexylmagnesium, diphenylmagnesium, ethylmagnesium hydride, butylmagnesium hydride, methoxy methylmagnesium, and ethoxy ethylmagnesium. Mixtures of any of these organomagnesium compounds can be used.

As pointed out above, the organomagnesium compound used as a catalyst in this invention is reacted with a polyreactive compound. The term "polyreactive" compound is intended to mean any compound, organic or inorganic, which has at least two sites for reaction with the organomagnesium compound. Thus, any compound which has at least two groups or sites to react with organomagnesium compounds to form an O—Mg, S—Mg, N—Mg, P—Mg, C—Mg, and the like, bond can be used. Such polyreactive compounds are compounds containing at least two active hydrogens, compounds containing one active hydrogen and one of the group selected from oxygen doubly bonded to carbon (C=O), oxygen doubly bonded to nitrogen (N=O), oxygen doubly bonded to sulfur (S=O), oxygen doubly bonded to phosphorus (P=O), sulfur doubly bonded to carbon (C=S), sulfur doubly bonded to phosphorus (P=S), nitrogen doubly bonded to nitrogen (N=N), and nitrogen triply bonded to carbon (C≡N), compounds containing no active hydrogen and at least two groups selected from C=O, N=O, S=O, P=O, C=S, P=S, C≡N, and N=S, and such polyreactive compounds as carbon monoxide and nitric oxide. As is well known, an active hydrogen is a hydrogen in a compound, organic or inorganic, wherein the hydrogen is attached to a nonmetallic element other than carbon such as oxygen, sulfur, nitrogen, phosphorus, and the like, and, therefore, active. It can also be hydrogen attached to carbon wherein the hydrogen atom is a so-called acidic hydrogen or hydrogen activated by the presence of some activating group (an electron withdrawing group) in the α-position to the carbon to which the active hydrogen is attached, as for example, hydrogen bound to a carbon α to a C=O group, α to a —COOR group, α to an S=O group, α to an N=O group, α to a C≡N group or the equivalent N≡C group, etc. Thus, the active hydrogen can be that present in one of the groups —OH, —SH, —NH$_2$, —NHR, —CONH$_2$, =CHNO, =CHNO$_2$, =N—OH, —SO$_3$H, —SO$_2$H, —O—SO$_2$H, —SO$_2$NH$_2$, —CH—CO—, =CH—C≡N, =CHSO$_2$—, and —COOH.

Exemplary of the active hydrogen compounds containing at least two active hydrogens that can be used as the polyreactive compounds for the reaction with the organomagnesium compound to form the catalyst are water; alkylene glycols and cycloaliphatic polyols, such as ethylene glycol, trimethylene glycol, tetramethylene glycol, pentamethylene glycol, glycerol, pentaerythritol, trimethylol propane, 2-butene-1,4-diol, 2-butyne-1,4-diol, 1,3-cyclohexanediol, 1,4-cyclohexanediol, and the like; polyhydric phenols such as resorcinol, hydroquinone, pyrocatechol, bisphenol A (p,p′-isopropylidenediphenol); ammonia; amines such as methylamine, ethylamine, n-butylamine, amylamines, and the like, arylamines, such as aniline, aralkylamines, such as benzylamine, cycloalkylamines, such as cyclohexylamine, diamines, such as ethylenediamine, diethylene triamine, triethylene tetramine, hexamethylene diamine, p-phenylenediamine, piperazine; hydroxylamine; aminoalcohols, such as ethanolamine and tetrahydroxyethyl ethylene diamine; hydrazine; phenyl hydrazine, amides such as urea, thiourea, acetamide, malonamide, and the like; sulfenamides and sulfonamides such as p-toluene sulfonamide; hydrogen sulfide; dimercaptans, such as ethanedithiol, 1,5-pentanedithiol, and dithioresorcinol; 2-mercaptoethylamine; dialkyl sulfides, dialkyl disulfides, dialkyl polysulfides; sulfones and hydroxysulfones, such as dibutylsulfone, hydroxyethyl methyl sulfone; sulfoxides, such as dibutyl sulfoxide, dimethyl sulfoxide; acids such as sulfuric acid, sulfurous acid, phosphorus acid, phosphoric acid, carbonic acid, acetic acid, oxalic acid, phthalic acid, ethylenediamine tetraacetic acid, α,α-dioctyl ethylenediamine diacetic acid, malonic acid, succinic acid, adipic acid, ketones, such as acetone, diacetyl, dibenzoylmethane, 2-hydroxyethyl methyl ketone, acetylacetone, acetonylacetone, diacetylacetone, acetophenone; esters, such as malonic esters, as for example, methyl malonate and ethyl malonate, acetoacetic acid, esters such as ethyl acetoacetate; nitro or nitroso alkanes such as nitromethane, nitroethane, and nitrosomethane; nitriles and isocyanides, such as acetonitrile and hydracrylonitrile 3-hydroxy-propionitrile); the hydrate of formaldehyde; (HNS)$_4$; and the like. Obviously, many other active hydrogen compounds wherein there are present in the molecule at least two active hydrogens can be used.

Exemplary of other polyreactive compounds that can be reacted with an organomagnesium compound to form the catalysts used in this invention are compounds containing one active hydrogen and one C=O group, as for example, benzoic acid; compounds containing one active hydrogen and one N=O group, such as nitrosophenol; compounds containing one active hydrogen and one S=O group such as benzene sulfinic acid; compounds containing one active hydrogen and one P=O group, as for example, dimethyl hydrogen phosphite; compounds containing one active hydrogen and one C=S group such as dithiobenzoic acid; compounds containing one active hydrogen compound and one P=S group such as esters of dithiophosphoric acid; compounds containing one active hydrogen and one C≡N group such as hydrogen cyanide; compounds containing at least two C=O groups and no active hydrogen such as carbon dioxide, glyoxal, the dialkyl esters or oxalic acid, and the like; compounds containing at least two P=S groups and no active hydrogen, as for example, phosphorus pentasulfide; compounds compounds containing at least two S=O groups and no active hydrogen, such as sulfur dioxide; compounds containing at least two P=O groups and no active hydrogen, such as phosphorous pentoxide and tributyl phosphate; compounds containing at least two C=S groups and no active hydrogen such as carbon disulfide; compounds containing at least two P=S groups and no active hydrogen, as for example, phosphorus pentasulfide; compounds containing at least two N=S groups and no active hydrogens, such as nitrogen sulfide ($N_4S_4$); compounds containing at least two C≡N or N≡C groups and no active hydrogen, as for example, cyanogen, phthalyl nitriles, phenylene isocyanide, and the like; compounds containing at least one N=N group, as for example, azobenzene; compounds containing at least one C=O group and at least one N=O group such as nitrosobenzaldehyde and nitrosobenzophenone.

The exact nature of this reaction product is not known; however, regardless of what the nature of the reaction is, it is essential that the reaction product retain magnesium to carbon bonds in an amount of from about 0.2 to about 1.8 hydrocarbon group per magnesium atom, and preferably from about 0.4 to about 1.2.

The amount of the polyreactive compound that is reacted with the organomagnesium compound will depend on the polyreactive compound, the organomagnesium compound, and the like, and to some extent upon the diluent, temperature, and the epoxide being polymerized. In any event, it should be within the range of from about 0.01 to about 0.7 mole per mole equivalent of magnesium compound, preferably from about 0.05 to about 0.6 and more preferably from about 0.1 to about 0.4, based on a difunctional reactive compound. Thus, in the case of a difunctional polyreactive compound such as water, one would use from about 0.02 to about 1.4 mole of water per mole of organomagnesium compound and preferably from about 0.1 to about 1.2 mole of water per mole of magnesium. If the polyreactive compound contains more than two reactive sites, the amount of the polyreactive compound will be reduced proportionately. In the case of magnesium compounds having the formula MgRR' where R is organo and R' is other than H or R, the ratio of polyreactive compound will be lower, as for example, in the range of from about 0.01 to about 0.35 mole equivalents. Below or above these ratios the polymerization is retarded or otherwise adversely affected, as for example, there is produced a liquid polymer instead of a high molecular weight solid polymer. By the term "equivalent mole ratio" as used in this specification and claims is meant the moles of polyreactive compound containing two reactive sites per equivalent of magnesium compound.

Any desired procedure can be used for reacting the organomagnesium compound with the specified ratio of the polyreactive compound. It is preferred that the organomagnesium compound and the polyreactive compound be prereacted by adding the specified amount of the polyreactive compound to a solution or dispersion of the organomagnesium compound in an inert diluent, as for example, a hydrocarbon diluent, such as n-hexane, n-heptane, branched aliphatic hydrocarbons, aromatic hydrocarbons, such as benzene and toluene, cycloaliphatic hydrocarbons, such as hexane and methylcyclohexene, or an ether such as diethyl ether and diisopropyl ether, or a mixture of such diluents. The reaction of the organomagnesium compound and the active hydrogen compound can also be carried out by reacting the two reagents in situ in the polymerization reaction mixture.

In some cases it has been found to be advantageous to react the organomagnesium-polyreactive compound reaction product with a complexing agent, as for example, an ether such as diethyl ether, tetrahydrofuran, and dioxane, a thioether, an aminoether, a tertiary amine, or a tertiary phosphine. In this case the organomagnesium compound can be reacted first with the polyreactive compound, and then with the complexing agent, or the latter can be added to the polymerization diluent, or the complexing agent can be present while forming the catalyst. The amount of complexing agent reacted with the catalyst varies widely with the nature of the complexing agent. Thus, with weak complexing agents such as diethyl ether and dioxane, one can use from 0.1 up to 100 or more moles per magnesium, and with stronger complexing agents such as tertiary amines, phosphines, some cyclic ethers, and the like, an amount of from 0.1 mole to about 10 moles per magnesium can be used, and preferably from about 1 mole to about 3 moles per magnesium is used. In the case of the weaker complexing agents such as diethyl diluent for the polymerization.

Any amount of the organomagnesium reaction product prepared as described above can be used to catalyze the polymerization process from a minor catalytic amount up to a large excess, but in general, will be within the range of from about 0.2 to 10 mole percent based on the magnesium and the monomer or monomers being polymerized and preferably will be within the range of from about 1 to about 5 mole percent. The amount used depends in part on such factors as monomer purity, diluent purity, and the like, less pure epoxides and diluents requiring more catalyst to destroy reactive impurities.

The following examples are illustrative of this invention. All parts and percentages are by weight unless otherwise indicated. The molecular weight of the polymers produced in these examples is shown by the Reduced Specific Viscosity (RSV). The term "Reduced Specific Viscosity" means the $\eta_{sp}/c$ determined on a solution of the polymer in a given diluent. Unless otherwise noted, the RSV of the polymers of the following examples was determined on a 0.1% solution of the polymer in chloroform at 25° C.

EXAMPLE 1

Into a polymerization vessel filled with nitrogen there were placed 9.9 parts of ethylene oxide, 0.1 part of 1-diethylamino-2,3-epoxypropane, and 31.4 parts of n-heptane. The vessel and its contents were equilibrated at 30° C. There was then added to the vessel a catalyst prepared from 0.23 part of triethylaluminum which had been reacted with 1.0 mole of acetylacetone per mole of aluminum and 0.5 mole of water per mole of aluminum in a 70:30 ether:n-heptane mixture. This catalyst was prepared by reacting a 0.5 M solution of triethylaluminum in 70:30 ether:n-heptane with 1 mole of acetylacetone per mole of aluminum at 0° C., agitating the mixture for 22 hours at 30° C., adding 0.5 mole of water per mole of aluminum with agitation, and then reacting the resulting mixture for 20 hours at 30° C. After 1.2 hours of polymerization reaction time, another equal portion of the catalyst was added to the reaction mass. After 7 hours, during which time the temperature of the reaction mass was maintained at about 30° C., the reaction was stopped by adding to the vessel 4 parts of anhydrous ethanol. The resulting reaction mass was then mixed with 35 parts of diethyl ether and filtered. The precipitated copolymer was then washed with diethyl ether, washed with 75 parts of a 0.5% solution of hydrogen chloride in an 80:20 diethyl ether:methanol mixture, washed neutral with an 80:20 diethyl ether:methanol mixture, and then washed once with a 0.4% solution of Santonox in diethyl ether. Santonox is a proprietary designation for 4,4'-thiobis(6-tertbutyl-m-cresol). The washed copolymer was dried for 16 hours at 50° C. in vacuo. The copolymer, a white solid, had an RSV of 17.9.

EXAMPLE 2

Ethylene oxide and 1-diethylamino-2,3-epoxypropane were copolymerized in accordance with the procedure of Example 1. In this example 9.7 parts of ethylene oxide and 0.3 part of 1-diethylamino-2,3-epoxypropane were employed. The copolymer of ethylene oxide and 1-diethylamino-2,3-epoxypropane produced in this example had an RSV of 19.9, and was a white solid.

EXAMPLE 3

Example 1 was repeated using 9 parts of ethylene oxide and 1 part of 1-diethylamino-2,3-epoxypropane. The copolymer of ethylene oxide and 1-diethylamino-2,3-epoxypropane thus produced had an RSV of 7.9, and was a white solid.

EXAMPLE 4

Ethylene oxide, 9.5 parts, 1-diethylamino-2,3-epoxypropane, 0.5 part, and dry toluene, 36.5 parts, were placed in a reaction vessel filled with nitrogen. The vessel and its contents were equilibrated at 30° C. There was then injected into the vessel 0.46 part of triethylaluminum which had been reacted with 0.5 mole of water per mole of aluminum and 0.5 mole of acetylacetone per mole of aluminum. This catalyst was prepared by reacting a 0.5 M solution of triethylaluminum in a 70:30 diethyl ether:n-heptane mixture with 0.5 mole of water per mole of aluminum at 0° C. (the water being added slowly over a 15-minute period), stirring the mixture for 1 hour at 0° C., and then adding 0.5 mole of acetylacetone per mole of aluminum over a period of 15 minutes. This mixture was then stirred for 15 minutes at 0° C. and then for 20 hours at room temperature (about 25° C.). After 22 hours of polymerization reaction time, during which time the temperature of the reaction mass was maintained at about 30° C., another equal portion of catalyst was added. After 29 hours the temperature of the reaction mass was raised to 50° C. and the polymerization reaction continued for an additional 43 hours. The reaction was then stopped by adding to the reaction mass 4 parts of anhydrous ethanol. The product of the reaction was then precipitated by adding 200 parts of diethyl ether to the reaction mass. The diethyl ether-insoluble precipitate was collected, washed once with diethyl ether and once with a 0.2% solution of Santonox in diethyl ether. The product was then stirred for 24 hours with 100 parts of a 3% aqueous solution of hydrogen chloride. The acid-insoluble portion was collected, washed neutral with water, and dried for 16 hours at 80° C. in vacuo. This fraction was a tough, rubbery, solid copolymer of ethylene oxide and 1-diethylamino-2,3-epoxypropane which was soluble in chloroform and which was amorphous by X-ray diffraction analysis. Elemental analysis showed that the copolymer contained 0.47% nitrogen, indicating that the copolymer contained 5.6% 1-diethylamino-2,3-epoxypropane as the hydrochloride. The acid-soluble portion was dialyzed until it was neutral, filtered, the water was evaporated, and the product was dried. This acid-soluble portion was a tough, rubbery, solid copolymer of ethylene oxide and 1-diethylamino-2,3-epoxypropane which was crystalilne by X-ray diffraction analysis, which had an RSV of 3.4, and which was comprised of 2.9% 1-diethylamino-2,3-epoxypropane as the hydrochloride.

EXAMPLE 5

Example 4 was repeated using 10 parts of 1-diethylamino-2,3-epoxypropane. No ethylene oxide monomer was used in the example. There was obtained a homopolymer of 1-diethylamino-2,3-epoxypropane which was a tacky, rubbery material.

EXAMPLE 6

Example 4 was repeated except that 8 parts of ethylene oxide and 2 parts of 1-diethylamino-2,3-epoxypropane were employed. The ether-insoluble, acid-insoluble copolymer obtained was a tough, brown rubber and was comprised of 2.5% 1-diethylamino-2,3-epoxypropane as the hydrochloride. The ether-insoluble, acid-soluble copolymer obtained was a tough, somewhat rubbery solid which had an RSV of 5.9, which was crystalline by X-ray diffraction analysis, and which was comprised of 3.0% 1-diethylamino-2,3-epoxypropane as the hydrochloride. About 0.10 part of the acid-soluble copolymer was agitated 1 day with about 9.9 parts of water and only a relatively small amount thereof dissolved in the water. About 0.03 part of concentrated hydrochloric acid was then added. The resulting mixture was agitated for 1 day at room temperature, and there was no visible change in appearance of the mixture. The insoluble portion of the mixture was recovered by filtration and found to be 0.028 part of a brown, rubbery solid which was amorphous by X-ray diffraction analysis, had an RSV of 1.9 as determined on a 0.05% solution thereof in chloroform at 25° C., and which contained 2.1% of 1-diethylamino-2,3-epoxypropane as the hydrochloride.

EXAMPLE 7

Five parts of 1-diethylamino-2,3-epoxypropane was placed in a reaction vessel filled with nitrogen. The reaction vessel was equilibrated at 30° C. Into the reaction vessel was injected 2.8 parts of a catalyst solution derived by mixing a 0.5 M solution of diethylmagnesium in diethyl ether with 0.8 mole of ammonia per mole of magnesium at 0° C. in the presence of glass beads and agitating the mixture for 20 hours while maintaining the mixture at 30° C. After 22 hours of polymerization reaction time, during which time the reaction mass was maintained at about 30° C., an equal amount of the catalyst was injected into the reaction vessel. After 29 hours of reaction time, the temperature of the reaction mass was raised to 50° C. and the polymerization reaction continued for an additional 43 hours. The reaction was stopped by adding 2 parts of anhydrous ethanol to the reaction mass. The reaction mass was then treated in accordance with the separation procedure of Example 4 except that acetone was substituted for diethyl ether in the precipitation and washing steps. About 0.3% of the monomer was converted to an acetone-insoluble, acid-insoluble solid polymer which was tan in color, was in the form of a film, and which contained 3.5% sulfate ash. About 2.7% of the monomer was converted to an acetone-insoluble, acid-soluble, rubbery, solid polymer which was in the form of a film. The polymer had an RSV of 0.73 and was an excellent flocculating agent.

EXAMPLE 8

Example 4 was repeated using 6 parts of propylene oxide and 4 parts of 1-diethylamino-2,3-epoxypropane and with the exception that after 45 hours the temperature of the reaction mass was raised to 50° C., and the equal portion of catalyst was added at 76 hours instead of after 22 hours, and the polymerization reaction was then continued for an additional 65 hours. The acid-insoluble, ether-insoluble copolymer was a hard, brown solid that had an RSV of 0.56, was amorphous by X-ray diffraction analysis, and contained 6.4% 1-diethylamino-2,3-epoxypropane as the hydrochloride.

EXAMPLE 9

To a polymerization vessel with a nitrogen atmosphere was charged 13.6 parts of diethyl ether, 6.7 parts of ethylene oxide and 3.3 parts of 1-diethylamino-2,3-epoxypropane. After equilibrating at 30° C., there was then injected 5.6 parts of a catalyst solution comprising a 50:50 mixture of diethyl ether and n-heptane and containing 0.79 part of triisobutylaluminum reacted with 0.5 mole of water per mole of aluminum, the catalyst solution being added in four portions at 30-minute intervals. After 19 hours at 30° C. the polymerization was stopped by adding to the reaction mass 4 parts of anhydrous ethanol, and the mixture was diluted with 35 parts of diethyl ether. The polymer was then isolated by centrifugation, washed once with ether and then with ether containing 0.2% Santonox. The polymer so obtained when dried was a dark brown, taffy-like solid. It was then extracted with hot toluene, and the toluene-insoluble polymer was extracted twice with water. The water-soluble fraction was recovered by evaporating the water and drying. This water-soluble fraction amounted to an 8% conversion and was a brown, viscous liquid having an RSV of 0.07 in 0.1% solution in water at 25° C. A nitrogen analysis showed that this copolymer of ethylene oxide and 1-diethylamino-2,3-epoxypropane contained 28% of the amine monomer. The hot toluene-soluble polymer fraction was dried 16 hours at 50° C. in vacuo to provide a solid copolymer having an RSV of 0.14, and this copolymer contained 26.4% 1-diethylamino-2,3-epoxypropane as indicated by nitrogen analysis. The RSV of this copolymer was .09 as measured on a 0.1% solution of the copolymer in water at 25° C.

EXAMPLE 10

Into a polymerization reaction vessel there were charged 5 parts of propylene oxide and 80 parts of toluene. After equilibrating the vessel and its contents at 30° C., there was added 0.46 part of triethylaluminum that had been reacted with 0.5 mole of water per mole of aluminum and 0.5 mole of acetylacetone per mole of aluminum as described in Example 4. After 19 hours of reaction time at 30° C., the temperature of the reaction mass was increased to 50° C., and after 3 hours at this temperature, the propylene oxide had completely polymerized. There was then added 5 parts of 1-diethylamino-2,3-epoxypropane to the reaction mass and the polymerization reaction carried out for an additional 24 hours at a temperature of 50° C. The reaction was then stopped by adding to the reaction mass 10 parts of anhydrous ethanol. To the resulting mixture there was added 0.5% of Santonox based on the weight of the polymer, and solvent was removed by evaporation. The polymer was then dried for 16 hours at 80° C. in vacuo to yield 5.5 parts of a rubbery solid. About 3 parts of this product was purified by dissolving it in 120 parts of acetone and then, while stirring, adding 150 parts of a 3% aqueous solution of hydrogen chloride. The insoluble portion of this mixture was collected, washed neutral with water, and dried for 16 hours at 80° C. in vacuo to provide 2.5 parts of a snappy rubber which, based on nitrogen analysis, contained 1.1% 1-diethylamino-2,3-epoxypropane as the hydrochloride, and which had an RSV of 10.8.

EXAMPLE 11

The polymerization reaction of Example 10 was repeated except that ethylene oxide was used in place of propylene oxide. The polymer isolation procedure of Example 4 was employed except that the ether-insoluble polymer was dried overnight at room temperature in vacuo to give 5.07 parts of a solid polymer which had an RSV of 11.3. Nitrogen analysis indicated that the polymer contained 3.1% of 1-diethylamino-2,3-epoxypropane. A 1% water solution of this polymer was very viscous. A flocculation test showed this product to be a better flocculating agent than a higher RSV commercial poly(ethylene oxide) flocculating agent.

EXAMPLE 12

In a polymerization reaction vessel filled with nitrogen there were mixed 8 parts of ethylene oxide, 2 parts of 1-diethylamino-2,3-epoxypropane, and 36.5 parts of toluene. After equilibrating the contents of the vessel at 30° C. there was added 5.6 parts of a catalyst solution derived by mixing a 0.5 M solution of diethylmagnesium in diethyl ether with 0.8 mole of ammonia per mole of magnesium at 0° C. in the presence of glass beads and agitating the mixture for 20 hours while maintaining the mixture at 30° C. After 1 hours of polymerization reaction time, the polymerization reaction was stopped by adding to the reaction mass 4 parts of anhydrous ethanol. The polymer isolation procedure of Example 11 was employed to give 3.15 parts of an ether-insoluble solid polymer which was crystalline by X-ray diffraction analysis and which had an RSV of 14.7. Nitrogen analysis indicated that the polymer contained 5.1% of 1-diethylamino-2,3-epoxypropane. This polymer was a good flocculating agent. A 1% aqueous solution of the polymer was very viscous. The water solution of the polymer contained some insoluble polymer which was recovered. This water-soluble polymer was 88% of the total polymer produced, had an RSV of 14.4, and was crystalline by X-ray diffraction analysis. Nitrogen analysis indicated that the water-soluble polymer contained 3.7% 1-diethylamino-2,3-epoxypropane. A tough, glossy film was prepared from the ether-insoluble polymer by molding it at 150° C. for 2 minutes under a pressure of about two tons per square inch. The film was drawn at room temperature to give a tough, oriented film. This polymer can also be solution spun or melt spun into the form of fibers which can be subsequently oriented by known procedures.

EXAMPLE 13

The polymerization reaction of Example 10 was repeated except that 5 parts of a $C_{16}$–$C_{18}$ 1-olefin oxide mixture was employed in place of propylene oxide, and 73 parts of toluene was employed instead of 80 parts. Also, twice as much catalyst was employed than that employed in Example 10, and the polymerization reaction was carried out for 20 hours at 30° C. and then for 5 hours at 50° C. before adding the 1-diethylamino-2,3-epoxypropane. The reaction mass was diluted with toluene and then the polymer was precipitated by adding this mixture to 4 volumes of methanol containing 1% by weight of Santonox. The insoluble polymer was collected, washed twice with a 1% solution of Santonox in methanol, and then dried for 16 hours at 80° C. in vacuo to give 4.44 parts of a rubbery, white solid. This polymer had an RSV of 1.4, and nitrogen analysis indicated that it contained 1.3% 1-diethylamino-2,3-epoxypropane.

EXAMPLE 14

Some of the polymers of the above examples were tested for use as flocculating agents, and these results are compared with commercially available poly(ethylene oxide) flocculating agents. The test was run by treating 1000 parts of a 3% slurry of kaolin in water at a pH of 6 with 200 p.p.m. of the specific polymer (added as a 1% aqueous solution). The resulting mixture was then stirred for 1 minute, and then the settling of the kaolin was observed over a 10-minute period. The volume of sedimentation obtained after 2 minutes is a measure of the effectiveness of the polymer additive as a flocculating agent. The least sedimentation volume indicates the most effective flocculating additive. Table I below sets forth the test results.

TABLE I

| Additive | RSV of Additive | Sedimentation Volume, ml. | |
|---|---|---|---|
| Polymer of Example 7 | 0.73 | 410 | Best subsidence rate—clear supernatant. |
| Polymer of Example 12 | 14.7 | 680 | Good subsidence rate—somewhat cloudy supernatant. |
| Polymer of Example 11 | 11.3 | 725 | |
| Poly(Ethylene Oxide) Commercial Coagulant Grade | 24.1 | 750 | |
| Poly(Ethylene Oxide) | 5.4 | 875 | |

EXAMPLES 15–19

In each of these examples, a nitrogen filled polymerization vessel was charged with 10 parts of the monomer, or monomers in the given ratio, and the diluent, 36 parts of toluene in Example 15, and 80 parts of toluene in Examples 16–19. The vessel and contents were equilibrated at the reaction temperature and there was then added to each a catalyst prepared from 0.9 part (Example 15) and 0.46 part (Examples 16–19) of triethylaluminum that had been reacted with 0.5 mole of water per mole of aluminum and 0.5 mole of acetylacetone per mole of aluminum as described in Example 4. At the end of the polymerization reaction time, the reaction was stopped by adding 4 parts of anhydrous ethanol. The homopolymer produced in Example 15 was isolated by adding 5 parts of acetylacetone and then pouring the mixture into 4 volumes of methanol (the monomer is soluble in methanol), separating the polymer, washing it twice with methanol and once with a 0.2% solution of Santonox in methanol and then drying it for 16 hours at room temperature under vacuum. The copolymers produced in Examples 18 and 19 were isolated by adding to the reaction mixture, 0.5% of Santonox (based on a 30% conversion to polymer), and then air-drying the reaction mixture in trays, extracting the films so obtained three times with 3% aqueous hydrogen chloride for 2 hours each time, washing neutral and then drying for 16 hours at 80° C. under vacuum. The copolymer of Examples 16 and 17 were isolated by adding 4 parts of acetylacetone to the reaction mixture and then pouring the mixture into 5 volumes of ether, collecting the ether-insoluble, washing the latter twice with ether and once with 0.2% Santonox in ether and then drying for 16 hours at 50° C. under vacuum.

In Table II are tabulated the monomers and ratio thereof, the abbreviation DEAPGE being used for m-diethylaminophenyl glycidyl ether, EO for ethylene oxide, and PO for propylene oxide, the reaction time and temperature and the percent conversion to isolated polymer, its RSV, percent of the amino epoxide comonomer in the product as determined by nitrogen analysis, and a description of the product.

monomers in the given ratio, and 36 parts of toluene as the diluent. After equilibrating the vessel and contents at the reaction temperature, there was added to each 1.0 part of dioctylmagnesium which had been reacted with 0.4 mole of ammonia in Example 20 and 0.5 mole of ammonia in Examples 21–23 per mole of magnesium as described in Example 7 but which catalysts had been heat-treated at 90° C. for 19 hours. At the end of the polymerization reaction time, the reaction in Examples 20, 22 and 23 was stopped by adding 4 parts of anhydrous ethanol. The homopolymer produced in Example 20 was isolated as described in Example 15. The copolymers produced in Examples 22 and 23 were isolated as described in Examples 17 and 19, respectively. In Example 21, the reaction was stopped by adding 5 parts of a 50:50 ethanol:acetylacetone and 0.5%, based on a 20% conversion to polymer, of the condensation product of croton aldehyde with about 3 moles of 3-methyl-6-tert-butylphenol as stabilizer. The polymer was precipitated by adding an equal volume of heptane containing 0.3 g. per liter of the above stabilizer. The insoluble polymer was separated, washed twice with the precipitant and dried 16 hours at 50° C. under vacuum.

In Table III are tabulated the monomers and ratio thereof, using the same abbreviations as used in Table II, the reaction time and temperature and the percent conversion to isolated polymer, its RSV, percent of the amino epoxide comonomer in the product as determined by nitrogen analysis, and a description of the product.

TABLE III

| Example | Monomer(s) | Reaction Conditions | | Isolated Polymer | | | |
|---|---|---|---|---|---|---|---|
| | | Temp., °C. | Hours | Percent Conv. | RSV | Percent Amino Comonomer | Description |
| 20 | DEAPGE | 50 | 19 | 32 | 5.9 | | Methanol insoluble. Rubbery. Low crystallinity. |
| 21 | 50 EO, 50 DEAPGE | 30 | 24 | 42 | 22.5 | 12.6 | Heptane insoluble. Moderate crystallinity. |
| 22 | 80 EO, 20 DEAPGE | 30 | 19 | 83 | 32.9 | 5.7 | Ether insoluble. Highly crystalline. Orientable plastic. |
| 23 | 50 PO, 50 DEAPGE | 30 | 19 | 22 | [1] 2.0 | 24.7 | Toluene soluble. Snappy rubber. |

[1] 0.1% in benzene at 25° C.

EXAMPLE 24

To a nitrogen filled polymerization vessel was charged 9.5 parts of epichlorohydrin, 0.5 part of diethylaminophenyl glycidyl ether and 36 parts of toluene. After equilibrating at 30° C., there was added 5.6 parts of a catalyst solution comprising a 50:50 mixture of diethyl ether and n-heptane and containing 0.79 part of triisobutylaluminum reacted with 0.5 mole of water per mole of aluminum, the catalyst solution being added in two portions, the second 19 hours after the first. After 27 hours reaction the polymerization was stopped by adding 4 parts of anhydrous ethanol. The reaction mixture was then diluted with 100 parts of ether, the ether insoluble was separated, washed once with ether, once with a 1% solution of hydrogen chloride in ethanol, washed neutral with methanol, then washed with a 0.4% solution of Santonox in methanol and dried for 16 hours at 25° C. under vacuum. The

TABLE II

| Example | Monomer(s) | Reaction Conditions | | Isolated Polymer | | | |
|---|---|---|---|---|---|---|---|
| | | Temp., °C. | Hours | Percent Conv. | RSV | Percent Amino Comonomer | Description |
| 15 | DEAPGE | 50 | 16 | 19 | 2.7 | | Methanol-insoluble polymer. Tacky gum rubber. Low crystallinity. |
| 16 | 50 EO, 50 DEAPGE | 30 | 19 | 3.2 | | | Ether-insoluble polymer. Tough rubber. Moderate crystallinity. |
| 17 | 80 EO, 20 DEAPGE | 50 | 1.6 | 5.1 | 5.5 | 6.1 | Ether-insoluble polymer. Rubbery orientable solid. Highly crystalline. |
| 18 | 50 PO, 50 DEAPGE | 30 | 19 | 6.0 | [1] 2.8 | 30.8 | Toluene soluble. Snappy rubber. |
| 19 | 80 PO, 20 DEAPGE | 50 | 1.6 | 16 | [1] >6.2 | 10.7 | Toluene soluble. Tough rubber. |

[1] 0.1% in benzene at 25° C.

EXAMPLES 20–23

In each of these examples, a nitrogen filled polymerization vessel was charged with 10 parts of the monomer, or copolymer so obtained amounted to a conversion of 8.5, had an RSV of about 1.1 and contained 26% of the amino epoxide as determined by chlorine analysis. It was a tough brown rubber.

EXAMPLE 25

Ten parts of diethylaminophenyl glycidyl ether was homopolymerized following the procedure described in Example 24 but allowing the polymerization to proceed for 163 hours before stopping it, two more portions of the catalyst solution being added at 27 and 43 hours. The homopolymer was isolated as described in Example 15. The polymer so obtained amounted to a conversion of 21%, had an RSV of 0.6, contained 6.0% nitrogen (theory is 6.3%), and was a tacky rubber.

EXAMPLE 26

Example 12 was repeated except that after isolating the 1-diethylamino-2,3-epoxypropane homopolymer by precipitation with 5 volumes of ether, the ether insoluble was collected, washed twice with ether and once with 0.2% Santonox in ether and dried. It was then dissolved in water, the water-insoluble was removed and the water-soluble polymer recovered. It amounted to a conversion of 29%, had an RSV of 14.4, was highly crystalline, was a soft, orientable film, and contained 3.7% of the amino epoxide as determined by nitrogen analysis. This copolymer was tested as a flocculating agent and found to be much better than an even higher molecular weight polyethylene oxide.

EXAMPLE 27

Ten parts of 1-diethylamino-2,3-epoxypropane was placed in a nitrogen filled reaction vessel and equilibrated at 30° C. There was then added 2.0 parts of dioctylmagnesium which had been reacted with 0.4 mole of ammonia per mole of magnesium in a 0.5 M solution in diethylether at 0° C. in the presence of glass beads, agitating for 20 hours at 30° C. and then heat treating for 19 hours at 90° C. After 19 hours, there was added an equal amount of the catalyst. After 310 hours at 30° C., there was added, without isolating the homopolymer, 70 parts of diethyl ether and 20 parts of dimethylsulfoxide, followed by 29 parts of dimethylsulfate. The reaction was allowed to proceed for 72 hours at 30° C. The reaction mixture was stirred with 250 parts of water and the water layer was then dialyzed until neutral.

A portion of the product was stripped of diluents at 50° C. and then dried for 16 hours at room temperature under vacuum. The quaternized homopolymer of 1-diethylamino-2,3-epoxypropane so obtained was rubbery in nature, amounted to 12% conversion based on the monomer, and contained 89% of the starting monomer based on gas chromatography for diethylmethylamine after decomposition of quaternary hydroxide. The quarternized polymer had an RSV of 7.9 as measured on a 0.1% solution in 0.1 M aqueous potassium chloride at 25° C.

Another portion of the product was tested for its fluocculation behavior on a 5% aqueous slurry of a finely divided crystalline silica having an average particle size of 5 microns and was found to be very effective, 250–500 p.p.m., based on silica, effecting rapid flocculation of the silica.

EXAMPLES 28–32

The homopolymer of Example 20 and the copolymers of Examples 16, 19, 22 and 23 were quaternized by heating a mixture of the polymer, tetrahydrofuran as diluent, and dimethylsulfate at 50° C. for 24 hours. The reaction mixture was diluted with 3 volumes of water, dialyzed until neutral and then was filtered through diatomaceous earth. The quaternized products were isolated by stripping off the diluents at 50° C. and then drying for 16 hours at 50° C. under vacuum.

In Table IV are tabulated the polymer used and amount thereof, the amounts of tetrahydrofuran (THF) diluent and of the dimethylsulfate, together with yield based on the starting polymer, percent of amino monomer present based on nitrogen analysis, the RSV determined on a 0.1% solution in 1 M aqueous potassium chloride at 25° C., and description of the product.

TABLE IV

| Example | Polymer of Example | Parts | Parts THF | Parts Dimethyl Sulfate | Isolated Product ||||
|---|---|---|---|---|---|---|---|---|
| | | | | | Percent Yield | Percent Amino Monomer | RSV | Description |
| 28 | DEAPGE, Homopolymer of 20 | 1.0 | 55 | 10 | 100 | 82 | 3.2 | Hard solid film. |
| 29 | EO-DEAPGE, Copolymer of 16 | 0.1 | 22 | 5.3 | 90 | 16 | 1.2 | Tough film. Moderately crystalline. |
| 30 | EO-DEAPGE, Copolymer of 22 | 2.0 | 110 | 27 | 90 | 27 | 1.7 | Tough film. Highly crystalline. |
| 31 | PO-DEAPGE, Copolymer of 23 | 1.0 | 22 | 5.3 | 50 | 40 | (¹) | Tacky rubber. |
| 32 | PO-DEAPGE, Copolymer of 19 | 1.0 | 55 | 14 | 84 | 14 | ² 2.5 | Rubber. |

¹ Insol.
² 0.1% in benzene at 25° C.

The quaternized homopolymer produced in Example 28 was tested for its flocculation behavior on a 5% aqueous slurry of a finely divided crystalline silica having an average particle size of 5 microns and was found to be very effective, 250–750 p.p.m., based on the silica, effecting rapid flocculation of the silica.

The quaternized ethylene oxide-diethylaminophenyl glycidyl ether copolymer produced in Example 29, tested as described above for the homopolymer of Example 28, was found to be a good flocculating agent, 500–750 p.p.m., based on the silica, effecting rapid flocculation of the silica.

The polymers of this invention will be comprised of, by weight, at least about 0.2%, and preferably at least about 2%, of an amino epoxide or a quaternized amino epoxide.

The polymers of this invention have utility as flocculating agents; as retention aids for adding sizing agents, fillers, and the like to paper; as textile sizes; as dyeing aids for fibers; as coatings for paper; as protective colloids; and as cross-linking agents for chlorinated polymers such as polyepichlorohydrin and poly(vinyl chloride).

Copolymers containing both amino groups and halogen radicals can be cross-linked at elevated temperatures or on prolonged standing without requiring vulcanizing agents which are often toxic, extractable materials. These copolymers that can be cross-linked by heating at elevated temperatures are useful as potting resins or encapsulants for electrical components and the like.

The block copolymers, especially those derived from the amino epoxides and long-chain hydrophobic epoxides as, for example, the $C_{12}$–$C_{18}$ 1-olefin oxides; hydroabietyl glycidyl ether, and the like, are especially useful as paper sizing agents and as waterproofing agents for textiles.

The amino epoxide homopolymers and copolymers of this invention can also be cross-linked with aliphatic dihalides such as ethylene dichloride or by blending the polymers with a halogen containing polymer such as a polyepihalohydrin.

Shaped articles such as molded members, films (oriented and unoriented), and fibers can be prepared from the polymers of this invention. Elastomeric fibers can be prepared from these polymers also.

The polymers can be used as the free amine, as a hydrogen halide, as an acid sulfate, as an acid phosphate salt, as a fatty acid, or as a resin acid salt. The amine group can, in some cases, particularly for amino aryl groups, be converted to a quaternary group by reaction with an alkyl halide such as methyl chloride, ethyl chloride, propyl bromide, ethyl fluoride, and the like, or an alkyl sulfate such as ethyl sulfate, methyl sulfate, and the like.

Crystalline and amorphous polymers that will range from hard, rigid solid materials to solid, rubbery or rubber-like materials are produced in accordance with this invention.

The polymers of this invention will have an RSV of at least about 0.15 as determined on a 0.1% solution thereof in chloroform at 25° C. Preferred polymers will have an RSV of about 0.5 and higher, and preferably greater than about 1.0. The RSV of the polymers can be determined in other solvents if required, and the equivalent RSV in chloroform can be calculated therefrom. In the case of water-soluble polymers, the preferred polymers will have an RSV of greater than about 0.5 as determined on a 0.1% solution thereof in water and preferably greater than 1.0. The preferred polymers will have a weight average molecular weight of 50,000 and greater and preferably 100,000 and greater.

By the term "epoxide" as used in this specification and claims is meant the oxirane ring, i.e., vicinal epoxides.

It is to be understood that the above description and examples are illustrative of this invention and not in limitation thereof.

What I claim and desire to protect by Letters Patent is:

1. As a new composition of matter, a solid polymer selected from the group consisting of homopolymers and copolymers with at least one other vicinal epoxide, said polymer having an RSV of at least about 0.15 as determined on a 0.1% solution of the polymer in chloroform at 25% C. derived from an amino epoxide selected from the group consisting of:

(I) an amino epoxide having the formula

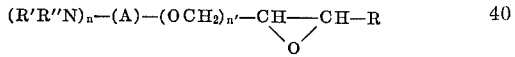

wherein
R' and R" each are selected from the group consisting of alkyl, cycloalkyl, aryl, haloaryl, alkaryl, aralkyl, aryloxyalkyl, and alkoxyalkyl,
A is a bivalent radical selected from the group consisting of
alkylene, cycloalkylene, arylene,

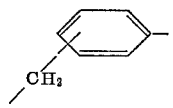

and

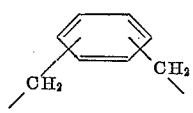

$n$ is an integer of from 1 through 3,
$n'$ is an integer of from 0 through 1,
R is selected from the group consisting of
$(R'R''N)_n$—(A)—$(OCH_2)_{n'}$— wherein R', R", A, $n$, and $n'$ are as above defined, hydrogen, alkyl, aryl, haloaryl, aralkyl, aryloxyalkyl, and alkoxyalkyl;
and wherein when A is arylene, R' and R" are each selected from the group consisting of hydrogen, alkyl, cycloalkyl, aryl, haloaryl, alkaryl, aralkyl, aryloxyalkyl, and alkoxyalkyl; and wherein when A is alkylene, $n$ is 1, and when A is selected from the group consisting of cycloalkylene, arylene,

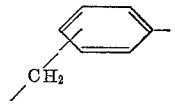

and

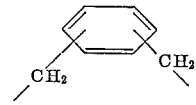

$n$ is an integer of 1 through 3;
(II) a quaternized amino epoxide having the formula

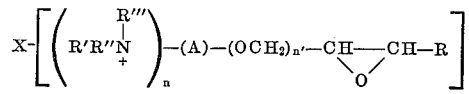

wherein
R, R', R", A, $n$, and $n'$ are as above defined, R''' is selected from the group consisting of alkyl, cycloalkyl, and aralkyl, and
$X^-$ represents an anion selected from the group consisting of chloride, bromide, iodide, fluoride, sulfate, phosphate, and $R_1COO^-$ where $R_1$ is a hydrocarbon radical; and
(III) an amino epoxide having the formula

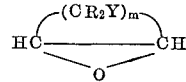

wherein
$m$ is an integer of from 3 through 10,
$R_2$ is selected from the group consisting of hydrogen and alkyl, and
Y is selected from the group consisting of hydrogen and R'R''N—wherein R' and R" are as above defined and wherein at least one Y is R'R''N—.

2. The composition of claim 1 wherein the amino epoxide is 1-diethylamino-2,3-epoxypropane.

3. The composition of claim 2 wherein the polymer is a homopolymer.

4. The composition of claim 2 wherein the polymer is a copolymer of said amino epoxide and an alkylene oxide.

5. The composition of claim 4 wherein the alkylene oxide is ethylene oxide.

6. The composition of claim 1 wherein the amino epoxide is m-diethylaminophenyl glycidyl ether.

7. The composition of claim 6 wherein the polymer is a homopolymer.

8. Th composition of claim 6 wherein the polymer is a copolymer of said amino epoxide and an alkylene oxide.

9. The composition of claim 8 wherein the alkylene oxide is ethylene oxide.

10. The composition of claim 3 wherein at least one amino group has been quaternized.

11. The composition of claim 7 wherein at least one amino group has been quaternized.

12. The composition of claim 8 wherein at least one amino group has been quaternized.

References Cited

UNITED STATES PATENTS

| | | | |
|---|---|---|---|
| 1,790,042 | 1/1931 | Eisleb | 260—2 |
| 2,870,100 | 1/1959 | Stewart et al. | 260—2 |

FOREIGN PATENTS

| | | |
|---|---|---|
| 477,843 | 1/1938 | Great Britain. |

WILLIAM H. SHORT, *Primary Examiner.*

L. PERTELLA, *Assistant Examiner.*

U.S. DEPARTMENT OF COMMERCE

PATENT OFFICE

Washington, D.C. 20231

UNITED STATES PATENT OFFICE
CERTIFICATE OF CORRECTION

Patent No. 3,403,114                  September 24, 1968

Edwin J. Vandenberg

It is certified that error appears in the above identified patent and that said Letters Patent are hereby corrected as shown below:

Column 6, line 75, "P=S" should read -- N=O --. Column 7, line 1, "phosphorus pentasulfide" should read -- nitrobenzene and nitrogen dioxide --. Column 8, line 13, after "diethyl" insert -- ether, the complexing agent may be used as the sole --.

Signed and sealed this 10th day of February 1970.

(SEAL)
Attest:

Edward M. Fletcher, Jr.                  WILLIAM E. SCHUYLER, JR.

Attesting Officer                          Commissioner of Patents